United States Patent [19]

Lehmbeck et al.

[11] Patent Number: 4,941,057
[45] Date of Patent: Jul. 10, 1990

[54] DIGITAL IMAGE PROOFING

[75] Inventors: Donald R. Lehmbeck; Roger L. Triplett, both of Penfield; Kevin E. Marks, Rochester, all of N.Y.

[73] Assignee: Xerox Corporation, Stamford, Conn.

[21] Appl. No.: 261,959

[22] Filed: Oct. 24, 1988

[51] Int. Cl.$^5$ ............................................. H04N 1/46
[52] U.S. Cl. ................................. 358/443; 358/75; 358/80; 358/455; 358/456; 358/401
[58] Field of Search ................... 358/429, 456, 75, 80, 358/401, 443, 448, 450, 457, 455

[56] References Cited

U.S. PATENT DOCUMENTS 3,914,788 10/1975 Nichaus ................................ 358/75
4,692,796 9/1987 Yamada et al. ...................... 358/75

FOREIGN PATENT DOCUMENTS 61238167 10/1986 Japan .

Primary Examiner—Edward L. Coles, Sr.
Assistant Examiner—Jerome Griant, II
Attorney, Agent, or Firm—Mark Costello

[57] ABSTRACT

An image processing arrangement for allowing a number of image processing techniques to be tested on a single sample sheet at a single time. A sample segment of the image may be selected for testing and successively repeated in a sample output for the number of image processing techniques to be tested. The proof page is printed on the printer, with the output of the proof page demonstrating the system operation with the desired image processing technique.

14 Claims, 4 Drawing Sheets

DIGITAL IMAGE PROOFING

The present invention relates generally to the use of digital image proofing techniques in electronic image reproduction, and more particularly, to a method of optimizing image reproduction by allowing a preview of an image using a number of selected image processing techniques.

CROSS-REFERENCE

Cross reference is made to U.S. patent application No. 124,123, entitled Address Token Based Image Manipulation, filed Nov. 23, 1987, and assigned to the same assignee as the present invention.

INCORPORATION BY REFERENCE

The following are incorporated herein by reference: U.S. Pat. No. 3,806,641 to Crooks; U.S. Pat. No. 4,149,194 to Holladay; U.S. Pat. No. 4,196,454 to Warren; U.S. Pat. No. 4,214,277 to Urich; U.S. Pat. No. 4,251,837 to Janeway, III; U.S. Pat. No. 4,517,605 to Yokomizo; U.S. patent application No. 124,123, U.S. Pat. No. 4,760,463 to Nonoyama et al. and U.S. Pat. No. 4,517,606 to Yokomizo et al.

BACKGROUND OF THE INVENTION

When electronic image data is acquired from an electronic input scanner, it is initially in an analog form. The sensing system of the raster input scanner detects the amount of light reflected from the scanned original and for a discrete area viewed, assigns the sensed light a representative analog value ranging over a continuous scale of values. Upon acquiring this data, the analog information is transformed into a digital approximation of the value, which in many applications may be represented, for example, by an 8 bit data byte, which has a resolution 256 levels of intensity. Since the data derived is indicative of various intensity levels, it must be converted into a format suitable for printing on an output device or display on a soft display device. For example, in a binary printing device, a two level output is required, while other devices allowing printing of more than two levels will require corresponding greater numbers of output levels. Generally, the 8 bit data of varying intensity is directed through a threshold device to determine whether the data for a selected location should be assigned a spot or a blank. The data value for any given pixel location is compared to a threshold value to determine whether a spot should be printed for that location, or if the location should be left blank. In simple applications, particularly for line graphics or text, a single threshold value may be applied to all the data derived by the scanner. Tonal range, contrast and other qualities of the output image may be varied by controlling the threshold conversion applied to the image.

When reproducing continuous tone graphics, such as photographs or paintings, it is often desirable to reproduce the original image grey. To print grey, the printer is directed to modulate the number of spots or intensity of spots within an area, rather than placing all spots or all blanks in the area. The result is perceived as grey. In a binary printer the density of grey is controlled by placing fewer or greater number of spots within the same unit of area. Selection of which pixels will appear as either spots or blanks is chosen on the basis of a digital halftone screen or dither matrix.

The screen is generally comprised of a processing arrangement which, for a defined area or half tone cell, provides a number of threshold values dispersed through the plurality of pixel locations within a defined matrix, not necessarily square. Each pixel location may be assigned a different threshold value to be applied to the scanner derived data during its processing for printing. If the area is to be black, all the pixels in the area will exceed the thresholds applied for all of the pixel locations throughout the area. For greys, the data will exceed the threshold values for a varying number of the pixels within the cell. Thresholding may be provided with the same process by providing a constant threshold value throughout the screen. A screen or screening function may also be provided by a mathematical process algorithm, which assigns a threshold value to a given pixel on a statistical basis without a fixed matrix. A class of processes known as error diffusion is an example of such a processing method.

Screens are designed for various output results, and may be used to emphasize dark or light in an output image. A variety of screen types are available which all produce grey, but provide different distributions for intensity levels throughout the screen area and, within screen types, contrast or thresholds may be varied. Differing screens may be selected for a variety of reasons such as optimizing reproduction of poor originals, enhancing images to show certain features, to create artistic effects, to minimize artifacts from previously screened input data such as moire or as described before, providing accurate reproduction of graphics. Screens may also provide different screen frequencies for better detail rendition, special effects, or accurate reproduction of complex and line graphics. In particular, a screen design must be different for each different printer or set-up of a printer. Images having a first screen applied may reproduce well on a first printer, but the same image screened with a second screen may reproduce better on another printer.

Other image processing arrangements offer the opportunity to vary an image and control its ultimate reproduction. Filters may be applied to the image to remove noise or the effects of previously applied image processing steps from the image. Enhancement filters may be applied to emphasize high frequency image data, perhaps at the expense of other features of the image.

Printers, by nature, have reproduction characteristics which may vary significantly, even among printers of identical manufacture. Such variations have the effect of varying the desired output by printing darkly or lightly the output information. These differences may be exacerbated by using certain screens on the scanner. For example, a printer which is tending to print very lightly may have considerable problems printing an image with a large amount of light print areas and slight variations of contrast. These gradations simply may not be printed, causing an undesirable quality of printing. A potential remedy to the problem may be to apply a different screen which may print a more contrasted image. If moire or aliasing appears, filtering may be appropriate. Visibility of an image feature may be desirable requiring enhancement of an image feature. Each printer makes a given spot pattern a slightly different size on output, and thus, the image will have a different darkness. Some printers will not print a single spot, or two spots lined up at one angle, but will print spots lined up at a different angle, thus changing the tone of the image. Compensation may be desirable for even day to day variations in the printing process.

It would be highly desirable to sample the output of any particular printer prior to producing a final document version, to determine the effect of any image processing technique, at that printer. In a network application, a user of an input scanner may have access to a number of printers. For example, the user may have a draft printer for composing a draft of the document, and another high speed printer for producing a large number of collated copies of the same document. Because the output quality of the draft printer and the high speed printer is not identical, it would be desirable for the user to pretest his image processing selections on the high speed printer before printing a large run of copies. Document compilation with graphics and print is not particularly fast, and repetitively producing test copies is a time consuming process.

U.S. Pat. No. 3,806,641 to Crooks demonstrates production of halftone characters from grey scale data. U.S. Pat. No. 4,149,194 to Holladay shows an arrangement which provides variable angle screens for processing the grey data. U.S. Pat. No. 4,196,454 to Warren describes a system for screening grey data and determining error between actual grey values and screened grey values to correct the output. U.S. Pat. No. 4,214,277 to Urich shows an arrangement for screening grey data. U.S. Pat. No. 4,251,837 to Janeway, III teaches an arrangement wherein an algorithm controls an image processing device to select between a grey scale screen and a black and white thresholding arrangement based on image data. U.S. Pat. No. 4,517,605 to Yokomizo shows the application of a screen to grey data wherein the screen is provided with a low spatial frequency. U.S. Pat. No. 4,517,606 to Yokomizo et al. demonstrates the use of a plurality of screens across a single image depending on the nature of the image data, showing that selected screens could be sampled across a page. U.S. Pat. No. 4,760,463 to Nonoyama et al. suggests that different scanning modes may be applied across a page at selected location. These references are incorporated herein by reference for their teachings.

The use of proofing tools is common in the photographic and printing industries, where the ability to quickly optimize the appearance of the final print is an economic necessity. These proofing devices generally include a means to isolate a portion of the image being printed, apply exposure, contrast, and/or color balance changes to the selected portion, and print it repetitively on a page. The single page is then put through the printing process and each small image evaluated for quality. A grouping of test images such as this is commonly referred to as a "ring around" in the graphic arts trade. Ring arounds display a large variety of image processing parameters in a small space and allow for side by side comparison. Devices such as step and repeat enlarging easels and variable density overlays are used in photographic darkrooms to create proof sheets.

Certain features of an image, as opposed to the entire image, are usually deemed more important or critical to image reproduction. It would therefore be desirable to sample the operation of an image processing technique with respect to a selected, critical area of an image, without repeating printing of a sheet with only a single imaging process technique applied to a single sheet.

SUMMARY OF THE INVENTION

In accordance with the invention, there is provided an image processing arrangement for allowing a number of image processing techniques to be tested on a single sample sheet at a single time. A sample segment of the image may be selected for testing and successively repeated in a sample output for the number of image processing techniques to be tested. The proof page is printed on the printer, with the output of the proof page demonstrating the printer operation with the desired image processing techniques.

In accordance with another aspect of the invention, the image processing techniques for use in the proof page are operator or automatically selectable from a group of possible techniques.

These and other aspects of the invention will become apparent from the following description used to illustrate a preferred embodiment of the invention read in conjunction with the accompanying drawings in which:

FIG. 1 demonstrates a block diagram of an image information processing device wherein the present invention finds use;

Digital image information in the form of image data picture elements, (hereinafter, pixels), digital voltage representations of image intensity at discrete locations in an image, is provided from a suitable source. For example, the image data pixels may be obtained through line by line scanning of an image bearing original by one or more photosensitive imaging devices, such as a multiple element array of charge coupled devices, commonly referred to as CCD's. Line by line scanning of an image bearing original for the derivation of image information is well known and does not form a part of the present invention. Of course, it will no doubt be appreciated that image information may be computer generated, or provided from an electronically stored original. While the present invention finds particular utility with an image scanning device, and will be described with reference thereto, the invention may also find relevant use in a loop back mode, or with a processing system which may or may not include a scanner. As used herein, the term "screen" or "screening function" will refer to a process of applying thresholds to data, whether those thresholds are distributed over a range of values over an area, as commonly understood to constitute a screen process, whether the screen applies a single threshold, commonly understood as a threshold process, or whether a mathematical or statistical process is used to apply a threshold or screen to data as in error diffusion methods. A variety of image processing techniques used to reproduce continuous tone or halftone pictorial input are known, as demonstrated for example in "A Survey of Electronic Techniques for Pictorial Reproduction", by J. C. Stoffel and J. F. Moreland, orignginally published at IEEE Transactions on Communications, Vol. COM-29, No. 12, Dec. 1981, pp. 1898-1925.

Figure 1:
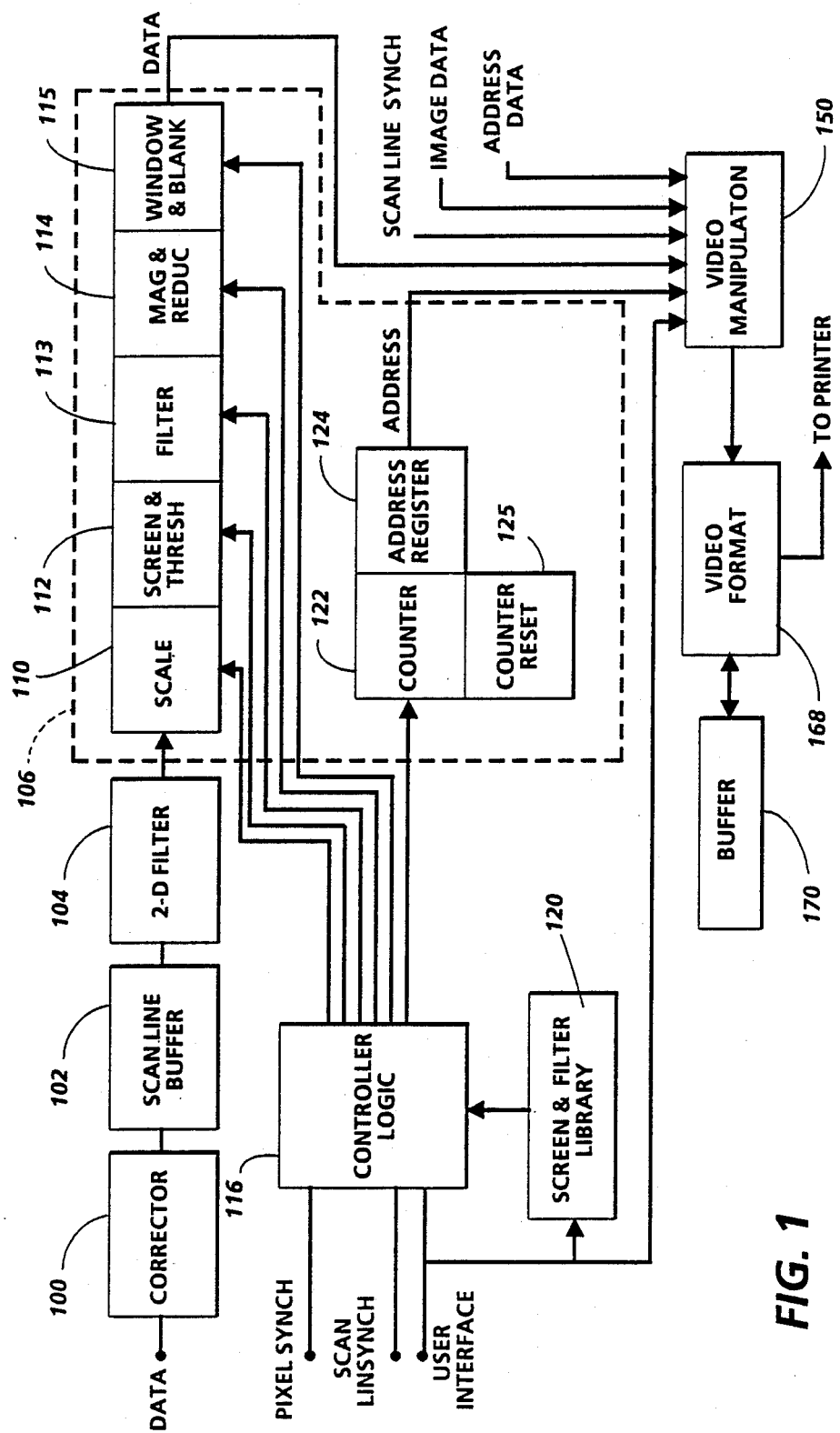

With reference now to the drawings, where the showings are for the purpose of illustrating a preferred embodiment of the invention and not for limiting same, FIG. 1 shows an image processing arrangement in an application incorporating the present invention, similar in principle to that described in U.S. patent application No. 124,123. In the described embodiment, image information or image data may be initially derived from an imaging device, typically comprising a scanning array of photosensitive elements, which generate analog signals in accordance with exposure to light imagewise reflected from an original document. When image information is produced from a scanning device, it might be produced along several channels, where each channel represents a portion of the scanning array from which image information is derived. Providing plural channels will allow parallel and faster processing of the image information. In a high density scanning array, which may have a length corresponding to the full width of a document to be scanned, several channels may be present; but, for the purpose of explaining the present invention, only a single channel will be illustrated.

Each channel directs image information to be converted to an analog to digital converter (not shown), functionally adjacent to the scanning array, from the analog signal initially derived from the scanning array to a digital grey level signal, typically an 8 bit data byte, into corrector 100. At corrector 100, data is normalized against a predetermined calibration to account for discrepancies in the sensitivity of each photosensitive element. The data is also deskewed to account for the order in which data is derived from each photosensitive element in the scanning array, and correction algorithms account for bad photosensitive element locations in the array by various interpolation and bad pixel discarding routines. Corrected data is stored into scan line buffer 102, which stores a plurality of scan lines for operation of the two dimensional filter 104. Two dimensional filter 104 detects and converts halftone screened data derived by the scanner into grey data for the prevention of moire effects. Because filtering routines useful in the conversion require information about the nearest neighbors to any particular pixel, scan line buffer 102 provides two dimensional filter 104 with data for groups of adjacent scan lines. It will, of course, be appreciated that while the data line is illustrated as a single line, the 8 bit data byte may transmitted from device to device along 8 parallel data transmission lines, or serially.

One dimensional image processor 106 is provided for operation on the data along each scan line, performing many common operations expected in image processing devices. Each of several processing function circuits, including scaling circuit 110, screening and thresholding circuit 112, filter circuits 113, including noise filters and enhancement filters, and other filters for correcting the image data resulting from previously applied image processing techniques, magnification and reduction circuit 114, and window and blanking circuit 115, are enabled by controller 116 for operation on data passing through one dimensional image processor 106. Any of the processing functions may be accomplished by a hardwired arrangement, or by a microprocessor operating in accordance with an appropriate instruction set. Controller 116 may be a microprocessor driven device, responsive to operator commands through user interface 118, and selection of functions, to cause controller logic to enable processing function circuits 110, 112, 114, 115. Pixel clock and pixel line synch signals are directed through controller 116 for control of the various image processing operations at appropriate points in the stream of data. Device memory, in this case illustrated as screen and filter library 120, is accessible through controller 116 to control the operation of the various functions in accordance with predetermined routines. The memory may be accessible to the user interface for the addition or access of information. In addition to these operations, one dimensional image processor 106 produces an address for each data image data byte in a scan line, as additional data for combination with each image data byte passing therethrough. All or part of the memory functions in the described arrangement could be located on a removable memory medium such as a floppy disk, or the like, in conjunction with an appropriate reading device. In addition to these operations, one dimensional image processor 106 produces an address for each image data byte in a scan line, as additional data for combination with each image data byte passing therethrough. Counter 122 is driven by controller logic 116 in accordance with a clocking or pixel synch signal to produce an address designation or token indicative of the position along the scan line of the image data byte passing through one dimensional image processor 106. Counter 122 incrementally loads latch or address register 124 with an address token for output with the image data byte. Periodically, the counter is reset to indicate a new scan line by counter reset 125. The result is that each addressed data byte has associated with it an address defining an ultimate location along the scan line. It will, of course, be appreciated that while the address line is illustrated as a single line, the several bit address token is transmitted from device to device along parallel data transmission lines. Other arrangements for controlling the image processing functions and supplying the information in memory to the image processing functions are possible.

Figure 2:
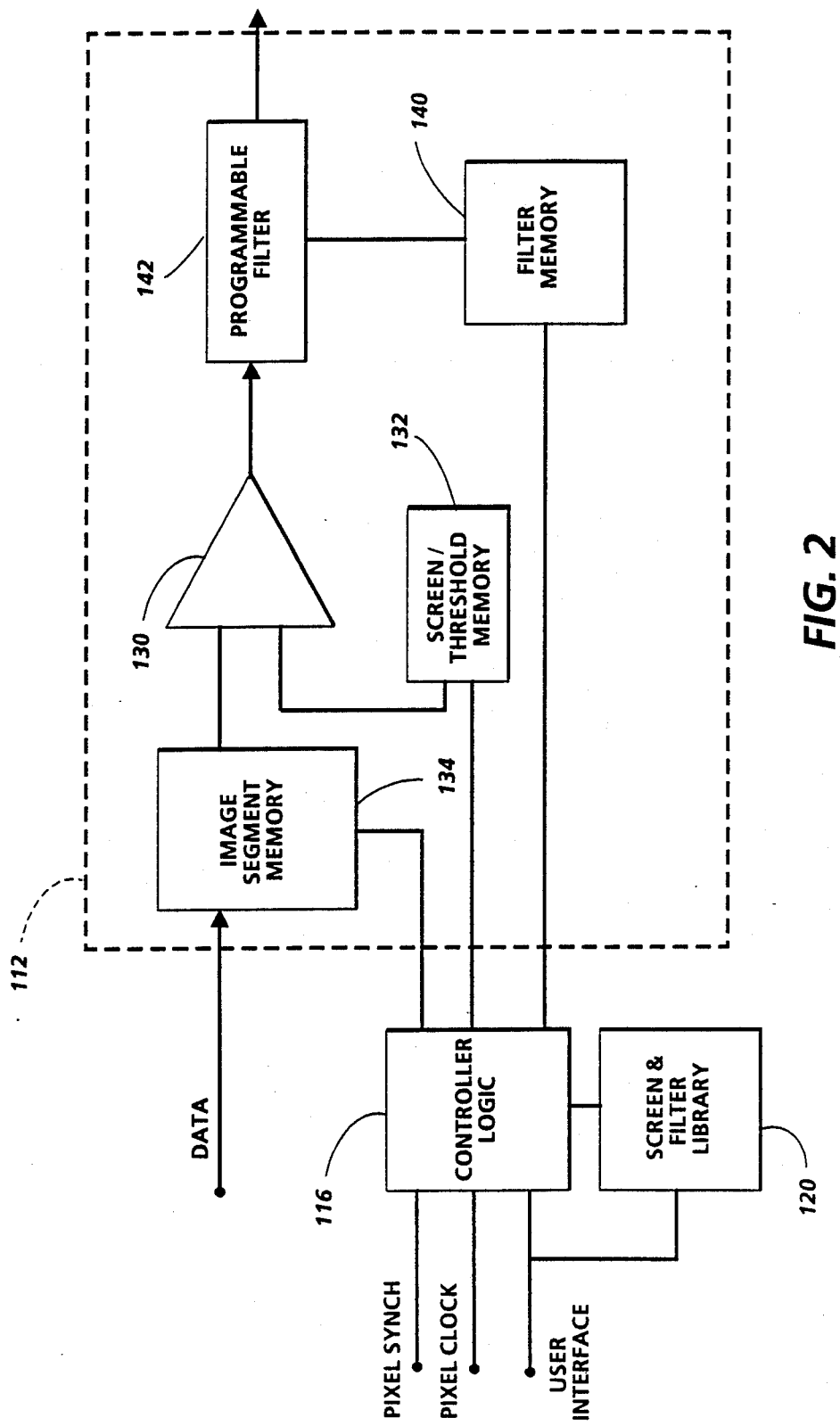
FIG. 2 is a block diagram illustrating the screening and filtering functions of an image processing device as indicated in FIG. 1.

With reference now to FIG. 2, in the described embodiment, screening function 112 includes a comparator 130 which compares grey level data from a selected area in the image with an element or cell in an array of pixel intensities pre-defined to produce a desirable binary result. In the present configuration, the particular array of pixel values, or a screen, is selected at the user interface 118 and loaded from a screen/threshold library 120 through the controller logic 116 into a screen and filter memory 132. Each pixel of the image is compared to a value in the screen to produce a binary output from the comparator, indicating for an single pixel whether a dot or space should be placed at the output, in accordance with whether the grey level of the pixel is greater or less than the selected intensity value for the cell in the screen array. A threshold function is similarly produced by applying a single uniform intensity value across the screen array. Of course, a wide variety of methods or function may be used to derive the applied threshold value for the screening function.

Figure 3:
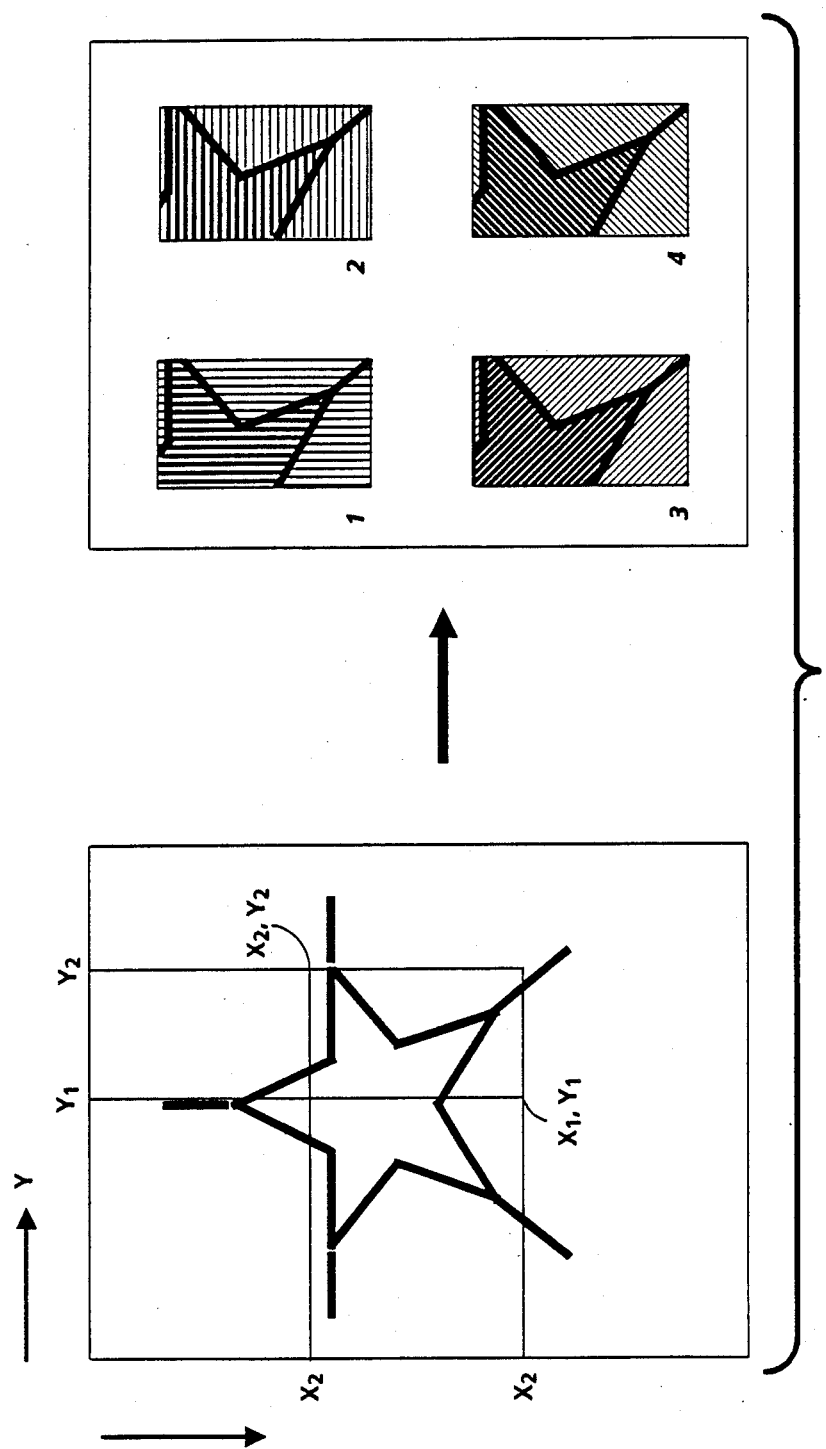
FIG. 3 is a block diagram illustrating how screened data is addressed for output to a proof page.

In accordance with the present invention, upon selection of proof sheet operation by the operator, controller 116 is programmed to accept document coordinates defining an area of interest within the image area. As shown in FIG. 3, the area may be defined in X, Y coordinates, where X is the fast scan direction, and the X value represents a pixel position across a line, and Y is the slow scan direction, and the Y value defines particular scan lines in the image. A rectangular area of interest in the image may be uniquely defined by entering two coordinates at the diagonals of the image, from which the other corners of the area may be easily determined. Definition of the area of interest by the operator may be accomplished with a variety of methods, depending on the application of the invention. Coordinate values may be directly entered from a data entry device; if the image is displayed on a screen, cursor position may be used; or the arrangement may provide an editing pad which allows selection of the area of interest from a document original through the use of sensors detecting the area that a stylus contacts. In any case, the coordinates are stored in the controller as X and Y values for comparison with pixel synch and pixel clock values as the image data is directed through the thresholding device. It should be appreciated that a user could also provide image data initially contemplated to form the area of interest, i.e., the original image input to the arrangement would be identical with the area of interest. It may also be appreciated that because no single screen satisfies all image requirements, plural areas of interest may be defined for a single proof sheet. More complex areas of interest may be defined by using a larger number of X and Y coordinates and appropriate algorithms to connect the selected coordinates.

Annotation or identification of each screen used to produce a sample may be provided (as shown in FIG. 3, 1, 2, 3, or 4) to identify the sample or screen. The information may be entered manually or computer generated, and merged into the final output.

Upon detection of the appropriate data by a positive comparison of the stored coordinates with pixel synch and pixel clock values, the image data within the described area is stored in image segment memory 134. For proof sheet operation, the remainder of the image data may simply be discarded or ignored. Screened image information suitable for use in a printer is provided as an output.

On completion of the screening process, a new screen is stored to screen/threshold memory 132 from screen and filter library 120, and the process of screening is repeated with the image data stored in image segment memory. The screens stored to screen/threshold memory 132 may be individually user selectable through the user interface and controller 116, selectable in groups of screens, or preselected by the controller in accordance with common screening requirements. Thresholds may be tested by applying a single threshold value to each pixel in the halftone cell comprising the screen. Image segment memory 134 is arranged in a loop back configuration to provide the image data for the area of interest to comparator 122 until the controller determines that the proof page is filled. Of course, the threshold function could be provided separately from the screening function, in any of many well known configurations.

Selection of plural filtering functions might be accomplished in a similar manner. Controller logic 116 provides a filter function from screen and filter library 120, for storage to filter memory 140. Filtering is then applied in accordance with the stored filter function to programmable filter 142. On completion of the filtering process on the defined area of interest, a new filter function is stored from screen and filter library 120, to filter function memory 140 for the next iteration of the area of interest. It will be noted that the test of the filter may be whether one is required or not, and review of the results of applying a filter versus not applying a filter.

Figure 4:
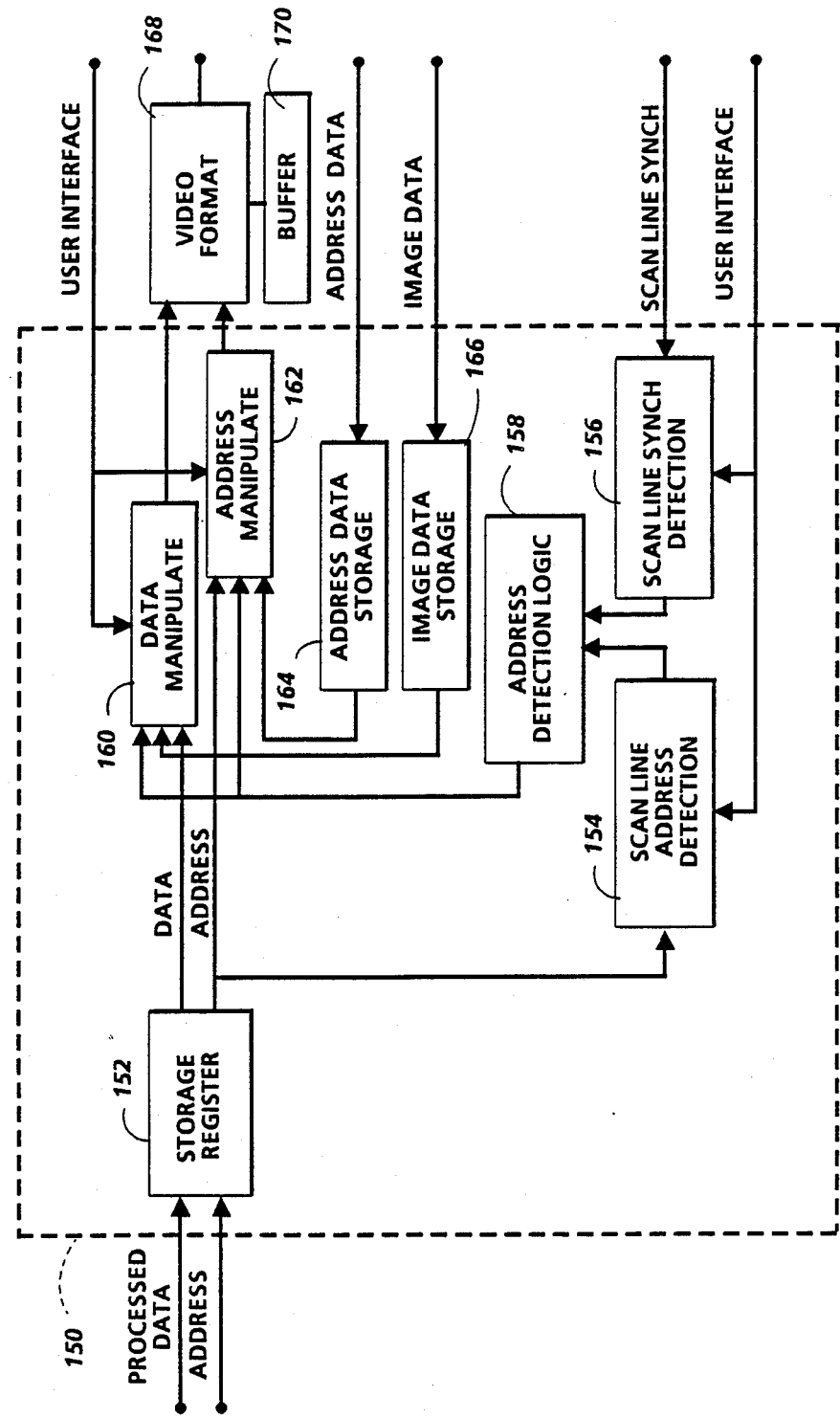
FIG. 4 demonstrates how a proof page in accordance with the invention might be produced.

With reference to FIG. 4, subsequent to one dimensional image processor 106, the data stream, now processed, composed of repetitive renditions of an area of interest with a selected image processing technique applied to each rendition, and position-defined by an address token, is passed to a video manipulation device 150. At this device, image manipulation is accomplished in accordance with preprogrammed instructions to arrange each rendition or repetition of the now-screened image data across the page as appropriate. Each data byte is passed to video manipulation device 150 into a latch or storage register 152. The address of the addressed image data byte in storage register 152 is compared to addresses of interest by scan line address detector 154, as received from the controller 116. Simultaneously, scan line synch detector 156 counts scan line synch signals, signals indicating the presence of a new scan line, for comparison with a synch signal value of interest received from controller 116, to determine whether the address token appears in a scan line of interest. In combination, the address token and synch signal uniquely define each image data byte on a page of data.

Upon detection of an address of interest, defined herein as an address that will be subject to address manipulation, address detection logic 158 produces a signal indicating an address of interest in accordance with the predetermined function defined at the user interface. Likewise, detection logic 158 produces a signal, to drive the address manipulation device 162. In normal circumstances, without a selected image processing function, addressed data bytes simply pass through the data manipulation device 160 and address manipulation device 162 unchanged. The nonsignificant data from the proof sheet operation is discarded.

When an address of interest is indicated to be in storage register 152, the proof page address routine is set into operation. Data required for the operation is temporarily stored at address and image data storage devices 164 and 166, and may be obtained from an exterior source, such as the proof page program. For the proof sheet program, each data byte address token is changed as necessary for placement on the sheet to accommodate a plurality of screen samplings.

Borders surrounding each repetition of the area of interest on the output may be supplied by simply providing blank image data at selected border addresses.

Subsequent to image processing, data bytes manipulated in the video manipulation device are transferred to the video format device 168. Video format device 168 combines the addressed data in buffer 170, stitching together the plurality of channels in accordance with their correct position along the scan line, and directing the addressed data bytes to the final address for printing.

While the only image processing techniques described relate to screening thresholding or filtering functions, it will no doubt be appreciated that the invention has application to any image processing arrangement wherein it is desirable to review the effect of several processing techniques on a critical area of a whole image. While in the past, image processing has been limited to a very small number of variable techniques to vary the image appearance, it may be expected that greater programability will become more prevalent. While the described embodiment is directed to a black and white arrangement, the invention has equal applicability to color, and processing directed to control of balance. Of course, multiple image processing techniques may also be applied to the proof data, to demonstrate the interaction of various image processing techniques.

While the invention has been described with respect to a primarily hardware implementation, it will no doubt be appreciated that a simpler, though perhaps slower operating implementation using a software implementation is certainly possible and within the scope of the invention. It will also no doubt be appreciated that while the implementation has been described in a self-contained operation, an example image segment repeated with a plurality of screens and produced in accordance with the invention may be derived from another source, and stored on a memory device such as a magnetic storage medium for use as a diagnostic test on a printer in a network system. Thus, the need to scan the document every time the diagnostic is to be repeated would be avoided. As an alternative arrangement avoiding the need to provide relatively expensive image segment memory, a document from which data is derived could be rescanned repetitively, and the example image formed by image formed by using only the data in the area of interest, with the document effectively acting as the storage medium.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. An image processing arrangement for producing a proof image demonstrating the effect of each of a plurality of selected image processing techniques on a single page of output, said arrangement comprising:
    means for supplying image data;
    means for selectively defining an area of interest within said image data;
    means for forming proof image data from said image data, composed of repetitions of said defined area of interest;
    an image processing device for controllably processing image data in accordance with a plurality of selectable image processing functions; and
    a controller operating said image processing device in accordance with each of a selected plurality of functions to apply each function to a repetition of said area of interest in said proof image data.

2. An image processing arrangement for producing a proof page demonstrating the effect of each of a plurality of image processing functions for an area of interest on a single page of output, said arrangement comprising:
    means for supplying image data;
    image processing means for applying a selected image processing function to image data;
    means for selectively providing a plurality of image processing functions to said image processing means;
    means for defining an area of interest within said image data;
    means for forming proof image data from said image data, composed of a plurality of repetitions of said selected area of interest; and
    means for selectively applying each of said plurality of selected image processing functions to a repetition of said area of interest in said proof image data.

3. A method for producing a proof page demonstrating the effect of each of a plurality of image processing functions on image data on a single page of output in an image processing arrangement, the method comprising:
    providing image data from a selected area of interest;
    forming a page of proof image data composed of a plurality of repetitions of said selected area of interest in said image data; and
    selectively applying each of a plurality of image processing functions to said proof image data;
    providing the proof image data on a single page of output, each repetition modified by selected image processing techniques.

4. A method of producing a proof page as defined in claim 3, including selecting said area of interest from a larger source of image data.

5. An image processing arrangement for converting grey level image data to a binary encoded output employing a screen, for printing at a binary printer, said arrangement comprising:
    means for reading original grey level image data;
    means for defining a selected area of interest in said image data;
    means for forming a proof page from repetitions of said area of interest;
    processing means for converting said grey level image data to a binary encoded output employing a different screen for each repetition.

6. An image processing arrangement as defined in claim 5, including memory means associated with said processing means for storing a plurality of screen functions.

7. An image processing arrangement for producing a proof image demonstrating the effect of each of a plurality of screen functions on a single page of output, said arrangement comprising:
    means for supplying image data;
    means for selectively defining an area of interest within said image data;
    means for forming proof image data from said image data, composed of repetitions of said selected area of interest;
    a screening device for applying a screen function to image data;
    a screen memory for storing a screen function for use in the screening device;
    a screen storage storing a plurality of screen functions for said screen memory; and
    a controller for selectively storing selected screens functions of said plurality of screen functions to said screen memory to apply at said screening device each of said selected plurality of screen functions to each repetition of said area of interest in said example image.

8. An image processing arrangement for producing a proof page demonstrating the effect of each of a plurality of screens for an area of interest on a single page of output, said arrangement comprising:
    means for supplying image data;
    screening means for applying a selected screen function to image data;
    means for selectively providing a plurality of screen functions to said screening means;
    means for defining an area of interest within said image data;
    means for forming proof image data from said image data, composed of a plurality of repetitions of said selected area of interest; and means for selectively applying each of said plurality of selected screen functions to a repetition of said area of interest in said proof image data.

9. A method for producing a proof page demonstrating the effect of each of a plurality of screens on image data on a single page of output in an image processing arrangement, the method comprising:
providing image data from an area of interest;
forming a page of proof image data composed of a plurality of repetitions of said selected area of interest; and
applying each of a plurality of screen functions to said proof image data;
providing the screened image data on a single page of output.

10. A method of producing a proof page as defined in claim 9, including selecting said area of interest from a larger source of image data.

11. An image processing arrangement for producing a proof image demonstrating the effect of each of a plurality of filter functions on a single page of output, said arrangement comprising:
means for supplying image data;
means for selectively defining an area of interest within said image data;
means for forming proof image data from said image data, composed of repetitions of said selected area of interest;
a filter device for applying a filter function to image data;
a filter memory for storing a filter function for use in the filter device;
a filter storage storing a plurality of filter functions for said filter memory; and
a controller for selectively storing selected filter functions of said plurality of filter functions to said filter memory to apply at said filter device each of said selected plurality of filters to each repetition of said area of interest in said proof image data.

12. An image processing arrangement for producing a proof page demonstrating the effect of each of a plurality of filter functions on an area of interest, on a single page of output, said arrangement comprising:
means for supplying image data;
filter means for applying a selected filter function to image data;
means for selectively providing a plurality of filter functions to said screening means;
means for defining an area of interest within said image data;
means for forming proof image data from said image data, composed of a plurality of repetitions of said selected area of interest; and
means for selectively applying each of said plurality of selected filter functions to a repetition of said area of interest in said proof image data.

13. A method for producing a proof page demonstrating the effect of each of a plurality of filter functions on image data, on a single page of output in an image processing arrangement, the method comprising:
providing image data from an area of interest;
forming a page of proof image data composed of a plurality of repetitions of said selected area of interest; and
applying each of a selected plurality of filter functions to each of said plurality of repetitions of said selected area of interest in said proof image data;
providing the filtered proof image data on a single page of output.

14. A method of producing a proof page as defined in claim 13, including selecting said area of interest from a larger source of image data.

* * * * *

UNITED STATES PATENT AND TRADEMARK OFFICE
CERTIFICATE OF CORRECTION

PATENT NO. : 4,941,057  
APPLICATION NO. : 07/261959  
DATED : July 10, 1990  
INVENTOR(S) : Donald R. Lehmbeck et al.

Page 1 of 1

It is certified that error appears in the above-identified patent and that said Letters Patent is hereby corrected as shown below:

On the title page item (56), left column, after "U.S. PATENT DOCUMENTS",

| | | | |
|---|---|---|---|
| replace: | "3,914,788 | 10/1975 | Nichaus .........................358/75 |
| | 4,692,796 | 9/1987 | Yamada et al. ................358/75" |
| with: | -- 3,806,641 | 4/1974 | Crooks ......................... 178/6.7 |
| | 3,914,788 | 10/1975 | Nichaus .........................358/75 |
| | 4,149,194 | 4/1979 | Holladay ..................... 358/283 |
| | 4,196,454 | 4/1980 | Warren .........................358/283 |
| | 4,214,277 | 7/1980 | Urich ...........................358/283 |
| | 4,251,837 | 2/1981 | Janeway, III ..................358/280 |
| | 4,517,605 | 5/1985 | Yokomizo ....................358/280 |
| | 4,517,606 | 5/1985 | Yokomizo et al. ...........358/280 |
| | 4,692,796 | 9/1987 | Yamada et al. ................358/75 |
| | 4,760,463 | 7/1988 | Nonoyama et al. ............358/280 -- |

On the title page item (56), right column, after "61238167   10/1986   Japan.", insert:

-- OTHER PUBLICATIONS

Stoffel et al., "A Survey of Electronic Techniques for Pictorial Reproduction"; IEEE Transactions on Communications; Vol. Com-29; No. 12; Dec. 1981; pp. 1898-1925. Reprinted - pp 289-316. --

Signed and Sealed this

Twenty-ninth Day of July, 2008

JON W. DUDAS  
*Director of the United States Patent and Trademark Office*